US009601110B2

(12) United States Patent
Itoh et al.

(10) Patent No.: US 9,601,110 B2
(45) Date of Patent: *Mar. 21, 2017

(54) UNSUPERVISED TRAINING METHOD FOR AN N-GRAM LANGUAGE MODEL BASED UPON RECOGNITION RELIABILITY

(71) Applicant: International Business Machines Corporation, Armonk, NY (US)

(72) Inventors: Nobuyasu Itoh, Tokyo (JP); Gakuto Kurata, Tokyo (JP); Masafumi Nishimura, Kanagawa-Ken (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/748,597

(22) Filed: Jun. 24, 2015

(65) Prior Publication Data

US 2015/0294665 A1    Oct. 15, 2015

Related U.S. Application Data

(63) Continuation of application No. 14/643,316, filed on Mar. 10, 2015.

(30) Foreign Application Priority Data

Mar. 27, 2014    (JP) ................................. 2014-065470

(51) Int. Cl.
*G10L 15/06* (2013.01)
*G10L 15/183* (2013.01)
(Continued)

(52) U.S. Cl.
CPC ............ *G10L 15/063* (2013.01); *G10L 15/18* (2013.01); *G10L 15/197* (2013.01); *G10L 2015/0635* (2013.01)

(58) Field of Classification Search
CPC ........... G10L 15/063; G10L 2015/0631; G10L 2015/0635; G10L 15/183; G10L 15/197
(Continued)

(56) References Cited

U.S. PATENT DOCUMENTS 6,823,307 B1 * 11/2004 Steinbiss ............... G10L 15/197
704/251
8,024,190 B2 * 9/2011 Hakkani-Tur ........ G10L 15/065
704/243
(Continued)

FOREIGN PATENT DOCUMENTS

WO    2007142102 A1    12/2007

OTHER PUBLICATIONS

List of IBM Patents or Patent Applications Treated as Related; JP920140010US2, Date Filed: Jun. 24, 2015, pp. 1-2.
(Continued)

*Primary Examiner* — James Wozniak
(74) *Attorney, Agent, or Firm* — Daniel C. Housley

(57) ABSTRACT

A computer-based, unsupervised training method for an N-gram language model includes reading, by a computer, recognition results obtained as a result of speech recognition of speech data; acquiring, by the computer, a reliability for each of the read recognition results; referring, by the computer, to the recognition result and the acquired reliability to select an N-gram entry; and training, by the computer, the N-gram language model about selected one of more of the N-gram entries using all recognition results.

9 Claims, 3 Drawing Sheets

(51) Int. Cl.
*G10L 15/197* (2013.01)
*G10L 15/18* (2013.01)

(58) Field of Classification Search
USPC .......................................... 704/243–244, 257
See application file for complete search history.

(56) References Cited

U.S. PATENT DOCUMENTS

| | | | | |
|---|---|---|---|---|
| 8,676,580 B2* | 3/2014 | Deshmukh | ............ | G10L 15/197 704/231 |
| 8,818,808 B2* | 8/2014 | Hakkani-Tur | ........ | G10L 15/063 704/243 |
| 9,009,025 B1* | 4/2015 | Porter | .................. | G10L 15/063 704/246 |
| 9,069,755 B2* | 6/2015 | Moore | ................ | G06F 17/2715 |
| 2002/0194004 A1* | 12/2002 | Glinski | ................. | G10L 15/197 704/270.1 |
| 2004/0088162 A1* | 5/2004 | He | ........................ | G10L 15/063 704/235 |
| 2007/0271088 A1* | 11/2007 | Waibel | .................. | G06F 17/275 704/9 |
| 2010/0063819 A1* | 3/2010 | Emori | .................... | G10L 15/197 704/251 |
| 2010/0121639 A1* | 5/2010 | Zweig | ................... | G06F 3/0237 704/239 |
| 2010/0324901 A1* | 12/2010 | Carter | ................... | G10L 15/197 704/255 |
| 2011/0161072 A1* | 6/2011 | Terao | ...................... | G06F 17/28 704/9 |
| 2012/0323557 A1* | 12/2012 | Koll | ...................... | G06F 17/276 704/8 |
| 2013/0166280 A1* | 6/2013 | Quast | .................... | G06F 17/241 704/9 |
| 2013/0211822 A1* | 8/2013 | Sakai | .................. | G10L 15/1815 704/9 |
| 2013/0262106 A1* | 10/2013 | Hurvitz | ................. | G10L 15/183 704/235 |
| 2013/0262110 A1* | 10/2013 | Xie | ....................... | G10L 15/183 704/235 |
| 2014/0195238 A1* | 7/2014 | Terao | ...................... | G10L 15/02 704/251 |
| 2014/0267045 A1* | 9/2014 | Grieves | ............... | G06F 17/2735 345/168 |
| 2015/0066502 A1* | 3/2015 | Achituv | .................. | G10L 15/26 704/235 |
| 2015/0066503 A1* | 3/2015 | Achituv | ............ | G06F 17/30746 704/235 |
| 2015/0228279 A1* | 8/2015 | Biadsy | .................... | G10L 15/26 704/235 |
| 2015/0279353 A1* | 10/2015 | Itoh | ........................ | G10L 15/18 704/243 |

OTHER PUBLICATIONS

Nobuyasu Itoh,"Unsupervised Training Method, Training Apparatus, and Training Program for N-Gram Language Model," U.S. Appl. No. 14/643,316, filed Mar. 10, 2015.

Bacchiani et al., "Unsupervised Language Model Adaptation", Proceedings. (ICASSP '03). 2003 IEEE International Conference on Acoustics, Speech, and Signal Processing, 2003, vol. 1, 4 pages. DOI: 10.1109/ICASSP. 2003.1198758.

Gretter et al., "On-line Learning of Language Models with Word Error Probability Distributions", 2001 IEEE International Conference on Acoustics, Speech, and Signal Processing, 2001, vol. 1, IEEE, 4 pages. DOI: 10.1109/ICASSP.2001.940892.

Hu et al., "Unsupervised Approach of Data Selection for Language Model Adaptation using Generalized Word Posterior Probability", APSIPA, ASC, 2011, 5 pages.

Nanjo et al., "Language Model and Speaking Rate Adaptation for Spontaneous Presentation Speech Recognition", IEEE Transactions on Speech and Audio Processing, vol. 12, No. 4, Jul. 2004, 10 pages. DOI: 10.1109/TSA.2004.828641.

Novotney et al., "Unsupervised Acoustic and Language Model Training With Small Amounts of Labelled Data", 2009 IEEE International Conference on Acoustics Speech and Signal Processing, Copyright 2009 IEEE, 4 pages. DOI: 10.1109/ICASSP.2009.4960579.

JP Office Action, Application No. 2014-065470, Dated Feb. 23, 2016, English Translation, 2 pages.

Decision to Grant a Patent, Application No. 2014-065470, Dated Mar. 30, 2016, English Translation, 3 pages.

Kajiura et al., "Review on a Method of Unsupervised Language Model Adaptation for Spoken Language", Joint convention of Institutes of Electrical and Information Engineers, 2005, Japan, 4 pages, Non-Translated Article, Translated portion of JP Office Action that applies to article.

JP Office Action, Notification of Reasons for Refusal, Application No. 2014-065470, Dated Feb. 15, 2016, English Translation, 3 pages.

Itoh et al., "Unsupervised Training Method, Training Apparatus, and Training Program for an N-Gram Language Model Based Upon Recognition Reliability", U.S. Appl. No. 15/286,747, filed Oct. 6, 2016.

List of IBM Patents or Patent Applications Treated as Related, dated Sep. 30, 2016, pp. 1-2.

* cited by examiner

UNSUPERVISED TRAINING METHOD FOR AN N-GRAM LANGUAGE MODEL BASED UPON RECOGNITION RELIABILITY

DOMESTIC AND FOREIGN PRIORITY

This application is a continuation of U.S. patent application Ser. No. 14/643,316, filed Mar. 10, 2015, which claims priority to Japanese Patent Application No. 2014-065470, filed Mar. 27, 2014, and all the benefits accruing therefrom under 35 U.S.C. §119, the contents of which in its entirety are herein incorporated by reference.

BACKGROUND

The present invention relates to a technique for improving an unsupervised training method for an N-gram language model.

Nowadays, language models are used in various fields such as speech recognition, machine translation, and information retrieval. The language models are statistical models for assigning an occurrence probability to a string of words or a string of characters. The language models include an N-gram model, a hidden Markov model, and a maximum entropy model, and among them, the N-gram model is most frequently used.

A language model is built by statistical training from training data. However, expressions used by users change from day to day, and new expressions are unknown to the language model trained from old training data. Therefore, the training data and the language model need to be updated on a regular basis.

Manual updating of the training data and the language model is not realistic. However, large amounts of speech data (hereinafter called field data) have recently been available with the emergence of a cloud type speech recognition system or a server type speech recognition system for providing voice search systems or speech recognition services, for example, in call centers. The results of unsupervised automatic recognition of these field data are useful to complement training data of the language model. The following will describe conventional techniques regarding the building of a language model and the use of the results of automatic speech recognition to build the language model or an acoustic model.

Norihiro Katsumaru, et al., "Language Model Adaptation for Automatic Speech Recognition to Support Note-Taking of Classroom Lectures," The Special Interest Group Technical Reports of IPSJ, SLP, Speech language information processing, vol. 2008, no. 68, pp. 25-30, 2008 discloses a technique for building a language model from utterance units including a high proportion of content words with the reliability of speech recognition results higher than or equal to a threshold value when university lecture data are used for language model adaptation.

JP2011-75622 discloses a technique in which, when acoustic model adaptation is performed using multiple adaptation data composed of speech data and text attached with a reliability obtained as a result of speech recognition of the speech data, unsupervised adaptation is performed directly using adaptation data with a relatively high reliability, speech recognition text is manually corrected preferentially for data having a phoneme environment that is not included in the adaptation data with the high reliability among adaptation data with relatively low reliabilities to perform supervised adaptation, and data with relatively low reliabilities and for which text is not corrected are applied with a weight lower than that of the other data to perform unsupervised adaptation.

JP2008-234657 discloses a technique as a pruning method for a language model capable of pruning the language model in a size suitable for the application, in which all the highest order n-grams and their probabilities are removed from an n-gram language model MO to generate an initial base model, and some of the most important pruned n-gram probabilities are added to this initial base model to provide a pruned language model.

Hui Jiang, "Confidence measures for speech recognition: A survey," Speech Communication, Vol. 45, pp. 455-470, 2005 presents confidence measures available as three categories indicating the reliability of recognition results of automatic speech recognition. This literature is cited as a reference literature showing an example of reliability available in the present invention.

SUMMARY

In one embodiment, a computer-based, unsupervised training method for an N-gram language model includes reading, by a computer, recognition results obtained as a result of speech recognition of speech data; acquiring, by the computer, a reliability for each of the read recognition results; referring, by the computer, to the recognition result and the acquired reliability to select an N-gram entry; and training, by the computer, the N-gram language model about selected one of more of the N-gram entries using all recognition results.

In another embodiment, an unsupervised training system for an N-gram language model includes a processing device configured to: read recognition results obtained as a result of speech recognition of speech data; acquire a reliability for each of the read recognition results; refer to the recognition result and the acquired reliability to select an N-gram entry; and train the N-gram language model about selected one of more of the N-gram entries using all recognition results.

In another embodiment, a non-transitory, computer readable storage medium having instructions stored thereon that, when executed by a computer, implement a training method for an N-gram language model. The method includes reading recognition results obtained as a result of speech recognition of speech data; acquiring a reliability for each of the read recognition results; referring to the recognition result and the acquired reliability to select an N-gram entry; and training the N-gram language model about selected one of more of the N-gram entries using all recognition results.

DETAILED DESCRIPTION

Figure 1:
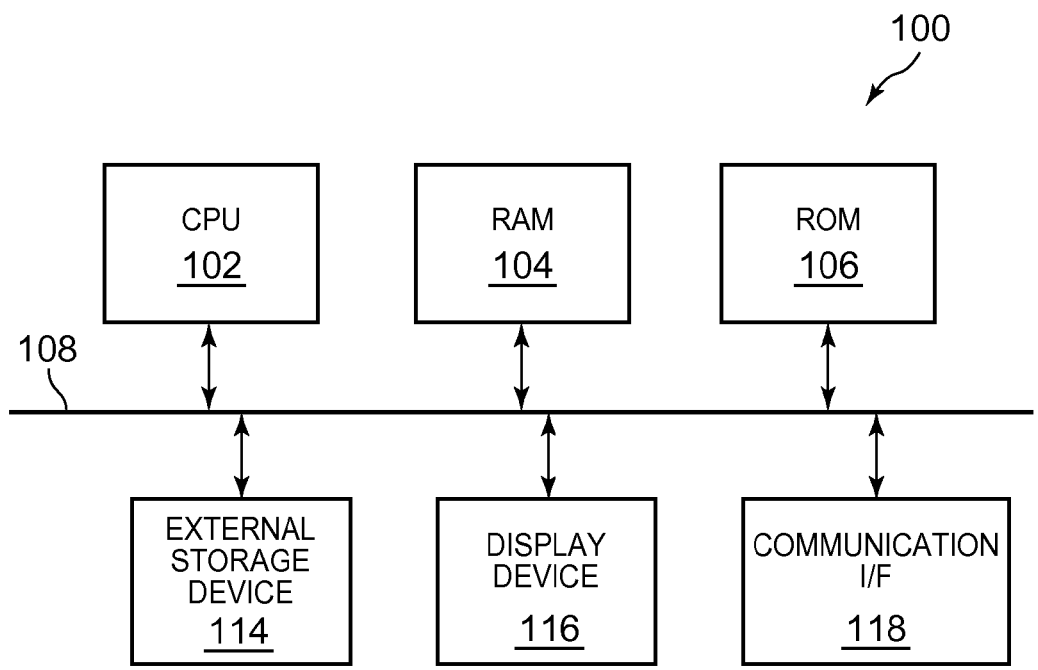
FIG. 1 shows an example of the hardware configuration of a computer 100 suitable for implementing an unsupervised training system for an N-gram language model according to an embodiment of the present invention.

As shown in Katsumaru, et al., discussed above, only the parts in which the reliability of speech recognition results is higher than or equal to the threshold value are used to build a language model so that use of parts likely to be recognition errors can be avoided. However, when only the highly reliable parts are extracted to build the N-gram language model, a distortion in the probabilities of N-gram entries to be calculated occurs. Further, as shown in Katsumaru, et al., even when only part of the data is targeted, it is not preferred to require human determination because it disturbs automation. Further, pruning of a language model shown in Jiang is a matter of choice of N-gram entries to be left, and since a language model before pruning can be used as the probabilities of N-gram entries, it cannot be applied to an unsupervised training method for the N-gram language model.

The present invention has been made in view of the above problems in the conventional techniques, and it is an object thereof to provide an improved, unsupervised training method, training system, and training program for an N-gram language model, which neither requires any manual correction nor causes any distortion in the probabilities of N-gram entries.

In order to solve the above problems with the conventional techniques, embodiments of the present invention provide an unsupervised training method for an N-gram language model including the following features. The training method includes: causing a computer to read recognition results obtained as a result of speech recognition of speech data; causing the computer to acquire a reliability for each of the read recognition results; causing the computer to refer to the recognition result and the acquired reliability to select an N-gram entry; and causing the computer to train the N-gram language model about selected one of more of the N-gram entries using all recognition results.

In one embodiment, the referring may include causing the computer to select each of the N-gram entries, whose number of appearances in the recognition results with the reliability higher than or equal to a predetermined threshold value exceeds a predetermined number of times.

Instead of the above configuration, the referring may include causing the computer to select each of the N-gram entries, whose number of appearances in the recognition results exceeds a predetermined number of times, where the number of appearances is given a weight according to the reliability.

Alternatively, the referring may include causing the computer to select each of the N-gram entries, whose sum of a first number of appearances in a first corpus as a set of all the recognition results and a second number of appearances in a second corpus as a subset of the recognition results with the reliability higher than or equal to a predetermined threshold value exceeds a predetermined number of times.

The referring may include causing the computer to select, from a first corpus, a second corpus, and a third corpus, each of the N-gram entries, whose sum of a first number of appearances in the first corpus as a set of all the recognition results, a second number of appearances in a second corpus as a subset of the recognition results with the reliability higher than or equal to a predetermined threshold value, and a third number of appearances in the third corpus as a baseline of the N-gram language model exceeds a predetermined number of times, where each of the first number of appearances, the second number of appearances, and the third number of appearances is given a different weight, respectively.

Here, each of the weights respectively given to each of the first number of appearances, the second number of appearances, and the third number of appearances may be estimated in advance by an EM algorithm using a language model estimated from each of subsets of the first corpus, the second corpus, and the third corpus.

In addition, the training may include causing the computer to train the selected one or more N-gram entries using all the recognition results and adding, to a baseline N-gram language model, the one or more N-gram entries and corresponding probabilities of the N-gram entries obtained as a result of the training.

The read recognition results of the speech data may be recognition results as a result of automatic speech recognition in a cloud type speech recognition system or a server type speech recognition system.

The posterior probability of a text unit obtained upon speech recognition of the speech data may be used as the reliability.

While embodiments of the present invention are described as the unsupervised training method for the N-gram language model, embodiments of the present invention can also be understood as an unsupervised training program for an N-gram language model causing a computer to execute each step of such a training method, and an unsupervised training system for an N-gram language model implemented by installing the training program on the computer.

In embodiments of the present invention, an N-gram language model is trained by using recognition results obtained as a result of speech recognition of speech data. According to the present invention, since all the recognition results are used to train selected N-gram entries while referring to the reliabilities of the recognition results and selecting the N-gram entries from part of the recognition results, no distortion in the probabilities of N-gram entries occur. The other effects of the present invention will be understood from the description of each embodiment.

While an embodiment for carrying out the present invention will be described in detail below with reference to the accompanying drawings, the embodiment to be described below is not intended to limit the inventions according to the appended claims, and all the combinations of the features described in the embodiment are not necessarily essential to the means for solving the problems. Note that the same reference numerals are given to the same elements throughout the description of the embodiment.

FIG. 1 shows an exemplary hardware configuration of a computer 100 for carrying out the present invention. In FIG. 1, an external storage device 114 or a ROM 106 can cooperate with an operating system to give instructions to a CPU 102 in order to record code of and various data on an unsupervised training program for an N-gram language model for carrying out the present invention. Then, each of multiple computer programs stored in the external storage device 114 or the ROM 106 is loaded into a RAM 104 and executed by the CPU 102. The external storage device 114 is connected to a bus 108 via a controller (not shown) such as a SCSI controller. The computer program can be compressed or divided into multiple parts and recorded on multiple media.

The computer 100 also includes a display device 116 for presenting visual data to a user. The display device 116 is connected to the bus 108 via a graphics controller (not shown). The computer 100 can be connected to a network through a communication interface 118 to communicate with another computer or the like.

The above-mentioned components are just an example, and all the components are not necessarily essential components of the present invention. It goes without saying that the computer 100 for carrying out the present invention can also include other components, such as an input device like a keyboard and a mouse, and a speaker.

It will be readily understood from the foregoing that the computer 100 is an information processing apparatus such as a normal personal computer, a workstation, or a mainframe computer, or a combination thereof.

Here, a brief summary of a language model generated according to the present invention will first be described.

Since an N-gram language model generated in the present invention is a simple yet effective model, it is most frequently used in large vocabulary continuous speech recognition today. The occurrence probability of a string of words $w_1 w_2 \ldots w_n$ composed of n words in a language model $P(W)$ can be expressed in the following equation:

$$P(w_1, \ldots, w_n) = \prod_{i=1}^{n} P(w_i | w_1 \ldots w_{i-1}) \quad (1)$$

However, since it is generally difficult to estimate the probability of the equation (1), the N-gram language model is based on the assumption that the occurrence of a word depends only on the occurrence of the previous (N−1) word(s). Therefore, the equation (1) can be approximated as follows:

$$P(w_1, \ldots, w_n) \approx \prod_{i=1}^{n} P(w_i | w_{i-N+1} \ldots w_{i-1}) \quad (2)$$

A model when N=1 is called a unigram, a model when N=2 is called bigram, and a model when N=3 is called a trigram. 2, 3, or 4 are frequently used as N in speech recognition.

The conditional probability of the above mathematical expression (2) can be determined by using maximum likelihood estimation from the numbers of appearances of a string of N words and a string of (N−1) words appearing in a corpus. When the number of appearances of a string of words $w_{i-N+1} \ldots w_i$ is expressed by $C(w_{i-N+1} \ldots w_i)$, the conditional probability $P(w_i | w_{i-N+1} \ldots w_i)$ is expressed by the following equation:

$$P(w_i | w_{i-N+1} \ldots w_{i-1}) = \frac{C(w_{i-N+1} \ldots w_i)}{C(w_{i-N+1} \ldots w_{i-1})} \quad (3)$$

However, in this calculation method, the occurrence probability of the string of N words that happen not to appear in the corpus becomes zero. To prevent this, probability smoothing is performed. As a typical smoothing method for the N-gram probability, there is back-off smoothing. This is a method of determining the occurrence probability of the string of N words that have not appeared from the occurrence probability of the string of (N−1) words. Note that the above method is just one example, and any other method can be used to apply the present invention. In the present invention, unsupervised training is performed on such an N-gram language model by using the speech recognition results.

Figure 2A:
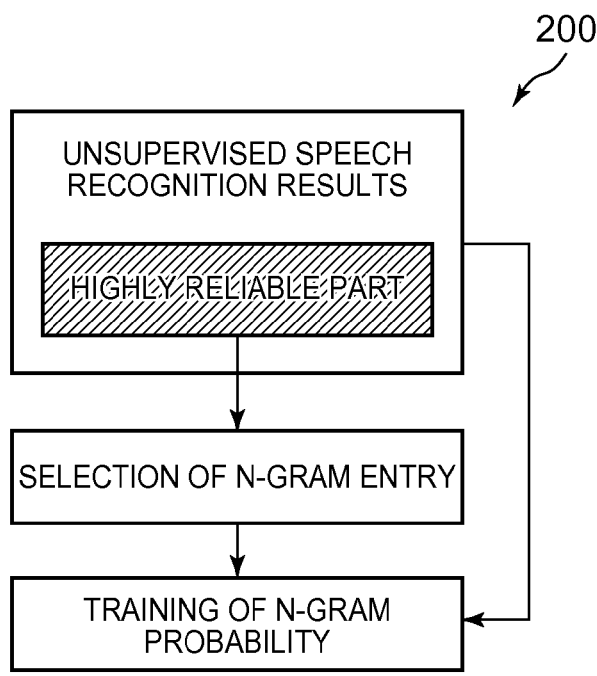
FIG. 2A is a chart showing an outline of an example of the unsupervised training system for the N-gram language model according to the embodiment of the present invention.

FIG. 2A is a chart showing an outline of an example of an unsupervised training system for an N-gram language model according to the embodiment of the present invention. An unsupervised training system 200 for an N-gram language model shown in FIG. 2A selects an N-gram entry with a high appearance frequency from a highly reliable part of the recognition results of automatic speech recognition of speech data. On the other hand, the training system 200 performs leaning of the N-gram language model using all the recognition results in determining the probability of the N-gram entry. The selected N-gram entry and the probability of the N-gram entry may be used to build an N-gram language model from scratch or to update an N-gram language model already built.

Figure 2B:
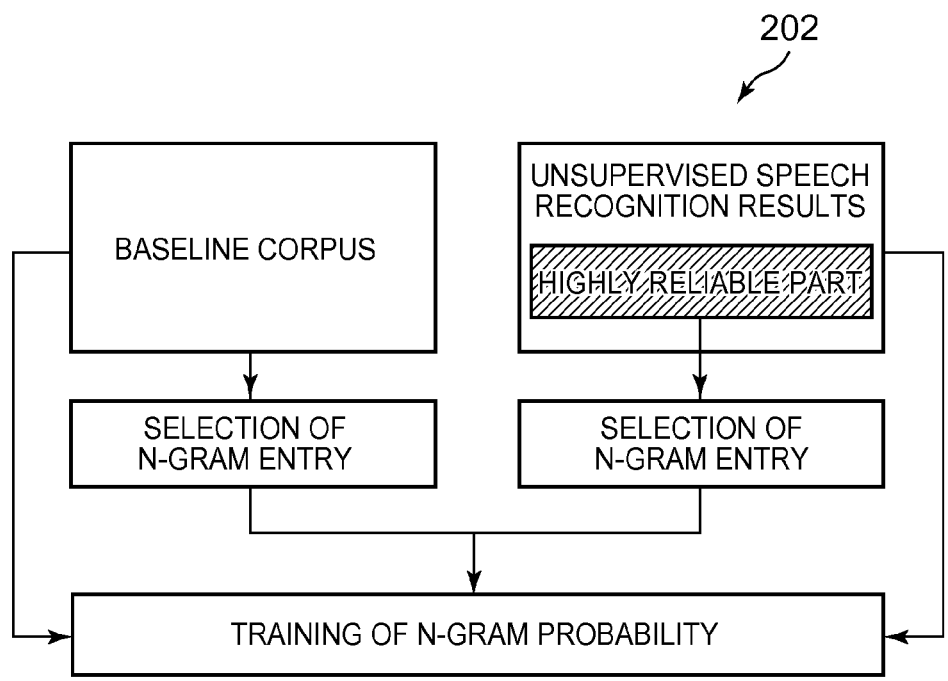
FIG. 2B is a chart showing an outline of another example of the unsupervised training system for the N-gram language model according to the embodiment of the present invention.

FIG. 2B is a chart showing an outline of another example of the unsupervised training system for the N-gram language model according to the embodiment of the present invention. An unsupervised training system 202 for an N-gram language model shown in FIG. 2B selects N-gram entries respectively with high appearance frequencies from a baseline corpus and a highly reliable part of the recognition results of automatic speech recognition of speech data. Then, the training system 202 performs training of the N-gram language model about the selected N-gram entries by using the baseline corpus and the entire recognition results. Like in the system 200 shown in FIG. 2A, the selected N-gram entries and the probabilities of the N-gram entries obtained as a result of the training may be used to build an N-gram language model from scratch or to update an N-gram language model already built.

Thus, in the unsupervised training system for the N-gram language model according to the embodiment of the present invention, the entire recognition results including a low reliable part are used in training the N-gram language model while selecting N-gram entry(entries) by referring to highly reliable recognition results. This is because of the following reason. Namely, since the highly reliable part is a subset of the entire recognition results thought the recognition results thereof are correct, it is a subset having a distribution different from the original distribution of words. For example, suppose that the word "computer" is an easily-recognizable word. In this case, assuming that the 10,000 words are included in the entire field data and the word "computer" appears in the field data 100 times, the 1-gram probability is 0.01. However, if 1,000 words are selected as the highly reliable part and all 100 "computer" words are included in the 1000 words because the word "computer" is easily recognizable, the 1-gram probability will become 0.1. To eliminate such a distortion, training of the N-gram language model is performed using the entire recognition results in the present invention.

Figure 3:
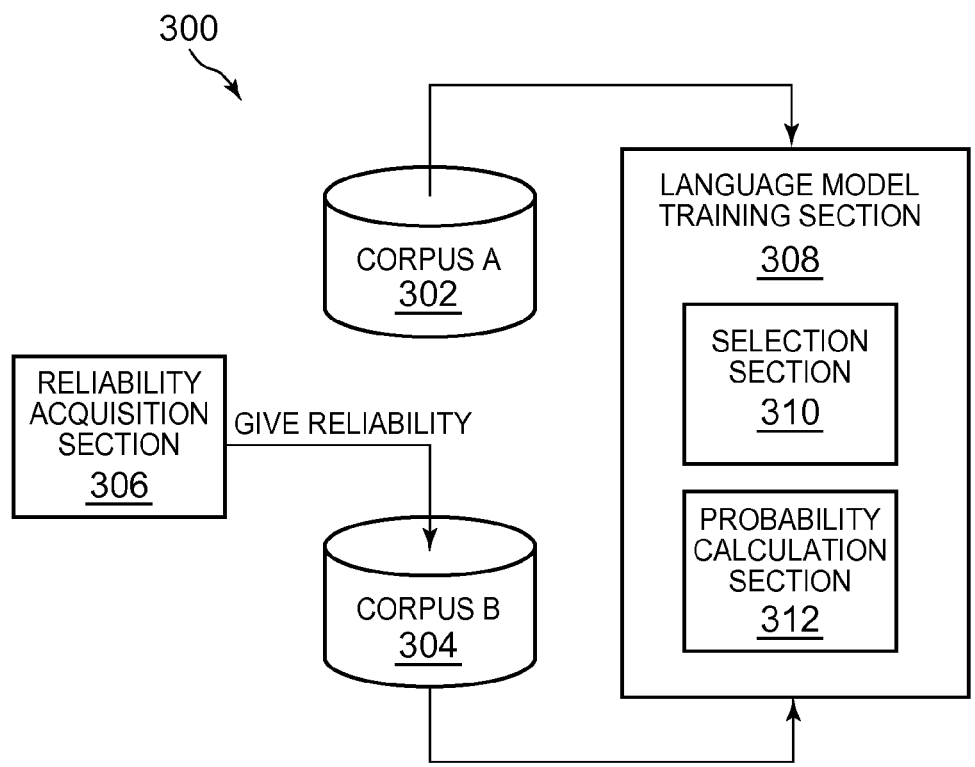
FIG. 3 is a functional block diagram of an unsupervised training system 300 for an N-gram language model according to the embodiment of the present invention.
Figure 4:
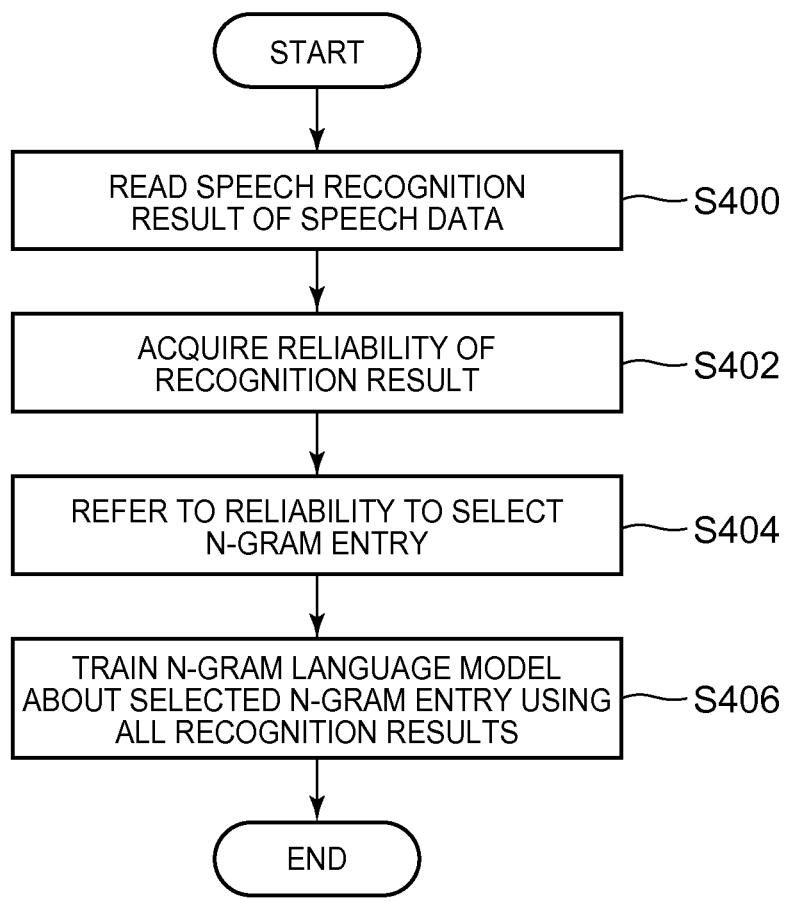
FIG. 4 is a flowchart showing an example of a flow of unsupervised training processing for the N-gram language model according to the embodiment of the present invention.

Referring to FIG. 3 and FIG. 4, an unsupervised training system 300 for an N-gram language model will be described in detail below. FIG. 3 is a functional block diagram of the unsupervised training system 300 for the N-gram language model according to the embodiment of the present invention. FIG. 4 is a flowchart showing an example of a flow of unsupervised training processing for the N-gram language model according to the embodiment of the present invention.

The unsupervised training system 300 for the N-gram language model shown in FIG. 3 includes a corpus A302, a corpus B304, a reliability acquisition section 306, and a language model training section 308. The language model training section 308 further includes a selection section 310 and a probability calculation section 312.

The corpus A302 is a baseline corpus used to build a part that forms the basis for the N-gram language model. As an example, the corpus A302 may be a corpus having a domain and a style consistent with a target application. As another example, the corpus A302 may be a corpus having an open domain and an open style. Further, the corpus A302 may be a corpus intended for written words on a magazine, newspaper, or the Internet, or a corpus intended for spoken text data obtained by transcribing a speech manually. In addition, the corpus A302 may be a corpus intended for both written words and spoken words.

The corpus B304 is a corpus composed of recognition results of automatic speech recognition of speech data without manual intervention. For example, such recognition results can be acquired from a cloud type speech recognition system or a server type speech recognition system for providing voice search systems or speech recognition services, for example, used in call centers. The recognition results can also be acquired by performing automatic speech recognition of speech data on TV news or the Web in a speech recognition system prepared by itself. It should be noted that since speech recognition operates word by word, the recognition results can also be acquired in the form of being divided into words.

The reliability acquisition section 306 calculates by itself or externally acquires a reliability indicating how reliable each text of the recognition results included in the corpus B304 is. A confidence measure to be newly derived in the future as well as currently known confidence measures (see Jiang) can be used as confidence measures to indicate the reliability to be acquired. Specifically, a confidence measure calculated as a logical sum of the likelihood of acoustic model and the likelihood of language model, a confidence measure using the posterior probability of a text unit obtained upon speech recognition, and a confidence measure calculated by the recall or precision of correct words as correct intersections between outputs of two or more speech recognition systems. Here, the posterior probability of the text unit obtained upon speech recognition is used. The posterior probability of the text unit is calculated by taking the logarithm of the posterior probabilities obtained in units of phonemes or the like upon recognition and adding them together.

If W denotes text of a recognition result and X denotes an observed speech signal, the posterior probability of a document unit can be expressed in the form of removing argmax from the following equation (5), where E denotes a set of all hypotheses:

$$\hat{W} = \underset{W \in \Sigma}{\mathrm{argmax}}\, p(W \mid X) \qquad (4)$$

$$= \underset{W \in \Sigma}{\mathrm{argmax}}\, \frac{p(W \mid X) \cdot p(W)}{P(X)} \qquad (5)$$

Although p(X) is not calculated when speech recognition is performed, p(X)-based normalization is performed when a reliability is calculated. P(X) is expressed by the following equation, where H denotes a hypothesis upon speech recognition:

$$p(X) = \sum_H p(X, H) = \sum_H p(H) \cdot p(X \mid H) \qquad (6)$$

Since it is difficult to sum up all the hypotheses, there are proposed various methods of approximating P(X). For example, there is a method of calculating a hypothesis using a model (background model) matching with many phonemes to calculate P(X).

The reliability calculated or acquired by the reliability acquisition section 306 is stored in the corpus B304 or another memory location in association with each text of the recognition results included in the same corpus B304. Note that, although the reliability is calculated in the text unit in the above description, the reliability can also be calculated in units of words. Further, when the speech recognition results are acquired externally from a cloud type speech recognition system or a server type speech recognition system, the reliability or information necessary to calculate the reliability (for example, the posterior probability of the text unit obtained upon speech recognition) is also acquired.

The language model training section 308 uses both the corpus A302 and the corpus B304 as training text to build an N-gram language model. More specifically, the language model training section 308 includes the selection section 310 for selecting N-gram entries that form an N-gram language model, and the probability calculation section 312 for determining the probability of each of the selected N-gram entries. Note that a subset of recognition results with corresponding reliabilities higher than or equal to a predetermined threshold value among the recognition results included in the corpus B304 is also called a corpus b below.

As an example, the selection section 310 selects, from the corpus A302 and the corpus B304, each of N-gram entries, whose sum of the number of appearances $C_A$ in the corpus A302, the number of appearances $C_B$ in the corpus B304, and the number of appearances $C_b$ in the corpus b exceeds a predetermined number of times. Here, the selection section 310 gives a different weight to each of the number of appearances $C_A$, the number of appearances $C_B$, and the number of appearances $C_b$ ($w_A$, $w_B$, and $w_b$ in this order), respectively. Each of the weights $w_A$, $w_B$, and $w_b$ can be determined by estimating a language model from each subset of the corpus A302, the corpus B304, and the corpus b, and performing optimization by an EM algorithm to maximize a generation probability of text for development set in a target field by using the estimated language model. Alternatively, each of the weights $w_A$, $w_B$, and $w_b$ may preset to a value derived from experience.

Since the corpus b is a subset of the corpus B304, a weight $w_B + w_b$ is given to the number of appearances of each of N-gram entries appearing in the corpus b. As a result, the N-gram entries appearing in the corpus b are selected more positively than other N-gram entries appearing only in the corpus B304.

Note that the use of the corpus A302 is optional, and N-gram entries may be selected without using the corpus A302. In other words, the selection section 310 may refer to each of the recognition results included in the corpus B304 and a corresponding reliability to select an N-gram entry. More specifically, the selection section 310 may select an N-gram entry whose number of appearances in the corpus b exceeds the predetermined number of times.

Instead of the above configuration, the selection section 310 may give a weight corresponding to the reliability to the number of appearances of each N-gram entry appearing in the corpus B304 and count the number of appearances. The selection section 310 may select each N-gram entry whose number of appearances thus counted exceeds the predetermined number of times.

The selection section 310 may also select each of N-gram entries, whose sum of the number of appearances in the corpus B304 and the number of appearances in the corpus b exceeds the predetermined number of times.

In any of the above configurations, the selection section 310 positively selects N-gram entries with high reliabilities from the recognition results.

The probability calculation section 312 uses all the recognition results included in the corpus A302 and the corpus B304 to train the N-gram language model about one or more N-gram entries selected by the selection section 310, or when only the corpus B is used as training data, the probability calculation section 312 uses all the recognition results included in the corpus B to train the N-gram language model about the selected one or more N-gram entries. The probability calculation method is as described in the outline of the N-gram language model. Further, a training tool, such as SRILM, the SRI language modeling toolkit from SRI International (http://www.speech.sri.com/projects/srilm/) or the like can be used.

The language model training section 308 may add, to the base N-gram language model, the selected one or more N-gram entries and their probabilities obtained as a result of the training, or build the N-gram language model from scratch.

Referring next to FIG. 4, the operation of the unsupervised training system for the N-gram language model according to the embodiment of the present invention will be described. Unsupervised training processing for the N-gram language model is started at step 400. Then, the reliability acquisition section 306 reads recognition results from the corpus B304 composed of the recognition results of automatic speech recognition of speech data, and calculates by itself or externally acquires the reliability of each of the recognition results (step 402). The acquired reliability is stored in association with the corresponding recognition result.

Then, the selection section 310 of the language model training section 308 selects N-gram entries that form at least part of the N-gram language model from the corpus A302 as the baseline corpus and the corpus B304 composed of the recognition results of automatic speech recognition of speech data (step 404). Here, the selection section 310 refers to the reliability calculated in step 402 to select each of N-gram entries appearing in highly reliable recognition results more positively than low reliable recognition results among the recognition results of automatic speech recognition of speech data.

Then, the probability calculation section 312 of the language model training section 308 trains the N-gram language model about one or more N-gram entries selected in step 404 using the corpus A302 and the corpus B304, i.e., using all the recognition results (step 406). After that, the processing is ended.

While the present invention has been described with reference to the embodiment, the technical scope of the present invention is not limited to the description of the aforementioned embodiment. It will be obvious to those skilled in the art that various changes and modifications can be added to the aforementioned embodiment. Therefore, forms to which such changes or modifications are added shall be included in the technical scope of the present invention.

The operations, the procedure, the steps, and the execution sequence of processes such as stages in the apparatus, system, program, and method described in the appended claims and the specification and shown in the accompanying drawings are not particularly specified as "ahead of," "prior to," or the like. It should be noted that the operations and the like can be carried out in any order unless the output of the previous process is used in the subsequent process. It should also be noted that, even when the output of the previous process is used in the subsequent process, any other process can intervene between the previous process and the subsequent process, or even when it is stated that any other process intervenes, the order of operations can be altered to execute the previous process immediately before the subsequent process. In the appended claims, the specification, and the operation flow in the drawings, "first," "next," "then," and the like are used for convenience sake, but it does not mean that it is imperative to carry out the operations and the like in this order.

The invention claimed is:

1. A computer-based, unsupervised training method for an N-gram language model, the method comprising:
    reading, by a computer, recognition results obtained as a result of speech recognition of speech data;
    acquiring, by the computer, a reliability for each of the read recognition results;
    referring, by the computer, to each recognition result's acquired reliability to select a subset of one or more N-gram entries for recognition results based upon their respective reliabilities; and
    training, by the computer, the N-gram language model for one or more entries of the subset of N-gram entries using all recognition results, wherein the referring includes selecting, by the computer, each of the N-gram entries, whose sum of a first number of appearances in a first corpus as a set of all the recognition results and a second number of appearances in a second corpus as a subset of the recognition results with the reliability higher than or equal to a predetermined threshold value exceeds a predetermined number of times.

2. The method of claim 1, wherein the training further comprises training, by the computer, the selected one or more N-gram entries using all the recognition results and adding, to a base N-gram language model, the one or more N-gram entries and a set of probabilities obtained as a result of the training.

3. The method of claim 1, wherein the acquired recognition results of the speech data are recognition results as a result of automatic speech recognition in a cloud type speech recognition system or a server type speech recognition system.

4. The method of claim 1, wherein a posterior probability of a text unit obtained upon speech recognition of the speech data is used as the reliability in the acquiring.

5. A computer-based, unsupervised training method for an N-gram language model, the method comprising:
    reading, by a computer, recognition results obtained as a result of speech recognition of speech data;
    acquiring, by the computer, a reliability for each of the read recognition results;
    referring, by the computer, to each recognition result's acquired reliability to select a subset of one or more N-gram entries for recognition results based upon their respective reliabilities; and
    training, by the computer, the N-gram language model for one or more entries of the subset of N-gram entries using all recognition results, wherein the referring includes selecting, by the computer, from a first corpus, a second corpus, and a third corpus, each of the N-gram entries, whose sum of a first number of appearances in the first corpus as a set of all the recognition results, a second number of appearances in a second corpus as a subset of the recognition results with the reliability higher than or equal to a predetermined threshold value, and a third number of appearances in the third corpus as a baseline of the N-gram language model exceeds a predetermined number of times, where each of the first number of appearances, the second number of appearances, and the third number of appearances is given a different weight, respectively.

6. The method of claim 5, wherein each of the weights respectively given to each of the first number of appearances, the second number of appearances, and the third number of appearances is estimated in advance by an EM algorithm using a language model estimated from each of subsets of the first corpus, the second corpus, and the third corpus.

7. The method of claim 5, wherein the training further comprises training, by the computer, the selected one or more N-gram entries using all the recognition results and adding, to a base N-gram language model, the one or more N-gram entries and a set of probabilities obtained as a result of the training.

8. The method of claim 5, wherein the acquired recognition results of the speech data are recognition results as a result of automatic speech recognition in a cloud type speech recognition system or a server type speech recognition system.

9. The method of claim 5, wherein a posterior probability of a text unit obtained upon speech recognition of the speech data is used as the reliability in the acquiring.

* * * * *